(12) United States Patent
Lavelle et al.

(10) Patent No.: US 7,181,507 B1
(45) Date of Patent: Feb. 20, 2007

(54) INTERNET BASED ACCESS POINT MANAGEMENT SYSTEM

(75) Inventors: Gary E. Lavelle, Avon, CT (US); James Yuan, San Jose, CA (US)

(73) Assignee: Harrow Products LLC, Montvale, NJ (US)

( * ) Notice: Subject to any disclaimer, the term of this patent is extended or adjusted under 35 U.S.C. 154(b) by 1309 days.

(21) Appl. No.: 09/618,516

(22) Filed: Jul. 18, 2000

(51) Int. Cl.
*G06F 15/177* (2006.01)

(52) U.S. Cl. .................. 709/220; 709/221; 707/10

(58) Field of Classification Search ........ 709/220–221, 709/223–225, 238, 201, 203, 206, 213, 217, 709/228, 204, 202, 219, 243, 205, 229; 370/352, 370/313; 707/10, 4, 207, 100; 455/432; 713/200, 1; 710/305, 100, 104; 345/538, 345/719; 719/315; 714/11; 717/11; 705/4, 705/36; 340/568, 825, 426; 70/280; 715/751; 711/119

See application file for complete search history.

(56) References Cited

U.S. PATENT DOCUMENTS

| | | | |
|---|---|---|---|
| 5,008,853 A * | 4/1991 | Bly et al. .................. 715/751 |
| 5,737,536 A * | 4/1998 | Herrmann et al. .......... 709/229 |
| 5,917,405 A * | 6/1999 | Joao .......................... 340/426.17 |
| 6,026,433 A * | 2/2000 | D'Arlach et al. ........... 709/217 |
| 6,029,196 A * | 2/2000 | Lenz .......................... 709/221 |
| 6,041,325 A * | 3/2000 | Shah et al. .................. 707/10 |
| 6,230,190 B1 * | 5/2001 | Edmonds et al. .......... 709/213 |
| 6,300,873 B1 * | 10/2001 | Kucharczyk et al. ..... 340/568.1 |
| 6,304,900 B1 * | 10/2001 | Cromer et al. .............. 709/221 |
| 6,330,817 B1 * | 12/2001 | Frolov ......................... 70/280 |
| 6,349,334 B1 * | 2/2002 | Faupel et al. ................ 709/224 |
| 6,363,414 B1 * | 3/2002 | Nicholls et al. ............ 709/206 |
| 6,374,296 B1 * | 4/2002 | Lim et al. .................... 709/225 |
| 6,470,358 B1 * | 10/2002 | Beyda et al. ................ 707/201 |

(Continued)

OTHER PUBLICATIONS

Replicated Invocations in Wide-Area Systems: A Possible Solution—Bakker, van Steen (1998); www.cs.vu.nl/pub/papers/globe/asci.98.1.ps.*

(Continued)

*Primary Examiner*—Thong Vu
(74) *Attorney, Agent, or Firm*—Michael Best & Friedrich LLP

(57) ABSTRACT

An internet based access point management system is accessible by at least one internet web browser configured to communicate one or more requests for modifying operation of one or more computer managed openings located at one or more facilities. The internet based access point management system includes at least one computer processor having a web server operative with the at least one computer processor. The web server is configured to receive and respond to one or more requests communicated from the at least one web browser. A database server which is also operative with the at least one computer processor and an application server further operative with the at least one computer processor are also provided. The application server is configured to communicate with the web server and the database server for processing requests. The processing of requests including formulating system commands in response to the requests. A communication link is configured to connect the application server and the one or more computer managed openings for communication therebetween. The communication includes system commands which modify operation of the one or more computer managed openings. A method of managing is also presented.

49 Claims, 5 Drawing Sheets

U.S. PATENT DOCUMENTS

| | | | |
|---|---|---|---|
| 6,526,442 B1 * | 2/2003 | Stupek, Jr. et al. | 709/224 |
| 6,560,632 B1 * | 5/2003 | Chess et al. | 709/201 |
| 6,563,814 B2 * | 5/2003 | Rowan et al. | 370/352 |
| 6,571,140 B1 * | 5/2003 | Wewalaarachchi et al. | 700/83 |
| 6,571,245 B2 * | 5/2003 | Huang et al. | 707/10 |
| 6,578,000 B1 * | 6/2003 | Dodrill et al. | 704/270 |
| 6,795,898 B2 * | 9/2004 | Weinreb et al. | 711/119 |
| 7,062,532 B1 * | 6/2006 | Sweat et al. | 709/205 |
| 2003/0004952 A1 * | 1/2003 | Nixon et al. | 707/10 |

OTHER PUBLICATIONS

Experience with LonWorks as a Fieldbus for the Light Source..—Jeram Juras Mavric; www.aps.anl.gov/icalepcs97/paper97/p173.pdf.*

Distributed Control Network For Agricultural Applications—Loukas Hadellis Vassilios ; www.isi.gr/eng/general/./kapsalis/ifac-caea-1998.pdf.*

CSci 8103: Distributed and Parallel Programming Final Exam—Safonov (1996); www-users.cs.umn.edu/~safonov/classes/8103-final.ps.*

Implementing a Parallel List on the SB-PRAM—Paul, Röhrig; www-wjp.cs.uni-sb.de/sbpram/papers/listpaper.ps.gz.*

Efficient Extensible Synchronization in Sather-13 Quittek, Weissman ; www.acl.lanl.gov/iscope97/papers/sather-iscope97.ps.*

* cited by examiner

INTERNET BASED ACCESS POINT MANAGEMENT SYSTEM

BACKGROUND OF THE INVENTION

The present invention relates generally to networks for managing operations of a system and, more particularly, the present invention relates to network management systems for managing access control systems.

Currently, access point management systems (APMS) typically include a desktop computer having a database for managing various access points such as a door or a locker. The administrator or operator logs onto the desktop computer and performs management functions such as assigning a user's access credentials, for example, card identification or access codes, grouping users access privilege with a respective access point and scheduling timed events such as a specific time interval during which access points may be in an accessible or in a lockout condition. For the stand-alone type of computer managed opening the operator uses a portable device, e.g. a palm top computer, to download the access information from the desktop computer and travels to the specific access point to download the data to a controller. The portable device may also retrieve data from the access point for uploading back to the desktop computer. In the situation where the access point is online, such as in the case of a network based computer managed opening, the access information can be exchanged with the controller of the access point without movement by the operator. In particular, the controller may be electronically connected to the desktop computer whereby operators may instantaneously modify operation of the access point without downloading or traveling to the access point.

A problem arises in that one or more administrators that are highly trained and experienced with computer hardware and software are required to handle and support each site. This is particularly so where the site is as large as a school or a university each of which typically has a relatively complex security system. For example, the facilities of a university may be spread across a number of buildings, each of which may include laboratories, cabinets and storage structures disposed therein to which various individuals may be authorized access on a specified basis. Accordingly sophisticated authorization systems may be required, for example, to grant general access to various groups of individuals or specific access to particular individuals themselves.

Each of the access points may include one or more locking devices, such as, for example, an electronic lock control mechanism which is integrated with a lock set of a door as described in U.S. Pat. No. 5,640,863 to Frolov issued Jun. 24, 1997, assigned to the present assignee hereof and entitled "Clutch Mechanism for Door Lock System". Another suitable example, is described in U.S. patent application Ser. No. 09/495,497 filed on Feb. 1, 2000 and entitled "Anti-jam Locking Mechanism for Electronic Security System also assigned to the present assignee hereof. The entire contents of both references are hereby incorporated herein by reference.

Since the administrator has total control and responsibility of the data base management and maintenance, relatively large resources in terms of training, knowledge and experience are required to maintain these security systems. In addition, hardware upgrade and software changes may cause compatibility problems for the administrator. In addition, periodical data base maintenance including integrity checks and backups must be undertaken on an ongoing basis. Accordingly, the combined direct and indirect administrative and maintenance cost of these activities may be significant especially when one adds the cost associated with a number of facilities.

In view of the foregoing, a need has arisen for providing for an efficient centralized access point management system for managing a plurality of sites using essentially a single management system.

SUMMARY OF THE INVENTION

Briefly stated, the invention in a preferred form is an internet based access point management system accessible by an internet web browser configured to communicate one or more requests for modifying operation of one or more computer managed openings located at one or more facilities. The internet based access point management system includes at least one computer processor having a web server operative with at least one computer processor. The web server is configured to receive and respond to one or more requests communicated from one or more web browsers. A database server which is also operative with the at least one computer processor and an application server further operative with the at least one computer processor are also provided. The application server is configured to communicate with the web server and the database server for processing requests. The processing of requests includes formulating system commands in response to the requests. A communication link is configured to connect the application server and the one or more computer managed openings for communication therebetween. The communication includes system commands which modify operation of the one or more computer managed openings.

In accordance with another embodiment of the present invention, a method of managing an access control system for a facility, employing at least one computer managed opening is provided. The method comprises the steps of generating a request to modify operation of one or more computer managed openings which are stand-alone, network or modem based; communicating the request to a remote computer managed opening server; processing the request at the remote computer managed opening server in order to generate an acknowledgement of the request and to generate one or more system commands; selecting the appropriate electronic format for the one or more system commands depending upon whether the one or more computer managed openings are stand-alone, network or modem based; and communicating the one or more system commands to the appropriate computer managed opening for modifying operation thereof.

In accordance with one embodiment of the invention the step of generating a request comprises inputting data to a web browser; the step of communicating the request comprises passing the request from the web browser to a web server over the internet; the step of processing is performed by an application server and comprises retrieving data concerning one or more computer managed openings from a data base; and the step of selecting the appropriate electronic format is also performed by the application server and comprises selecting file transfer protocol for the system commands where the computer managed opening has a stand-alone type configuration and selecting electronic mail message format for the system commands where the computer managed opening is network or modem based.

An object of the present invention is to provide a distributed management system for managing a plurality of security systems located at multiple facilities.

Another object of the present invention is to provide a management system for access control systems which is efficient and reduces the maintenance and management costs for each facility.

A further object of the present invention to provide a management system which may be operated without significant training and continuing education requirements for the facility operators.

Other objects and advantages of the invention will become apparent from the specification and the drawings.

DETAILED DESCRIPTION OF THE PREFERRED EMBODIMENTS

Figure 1:
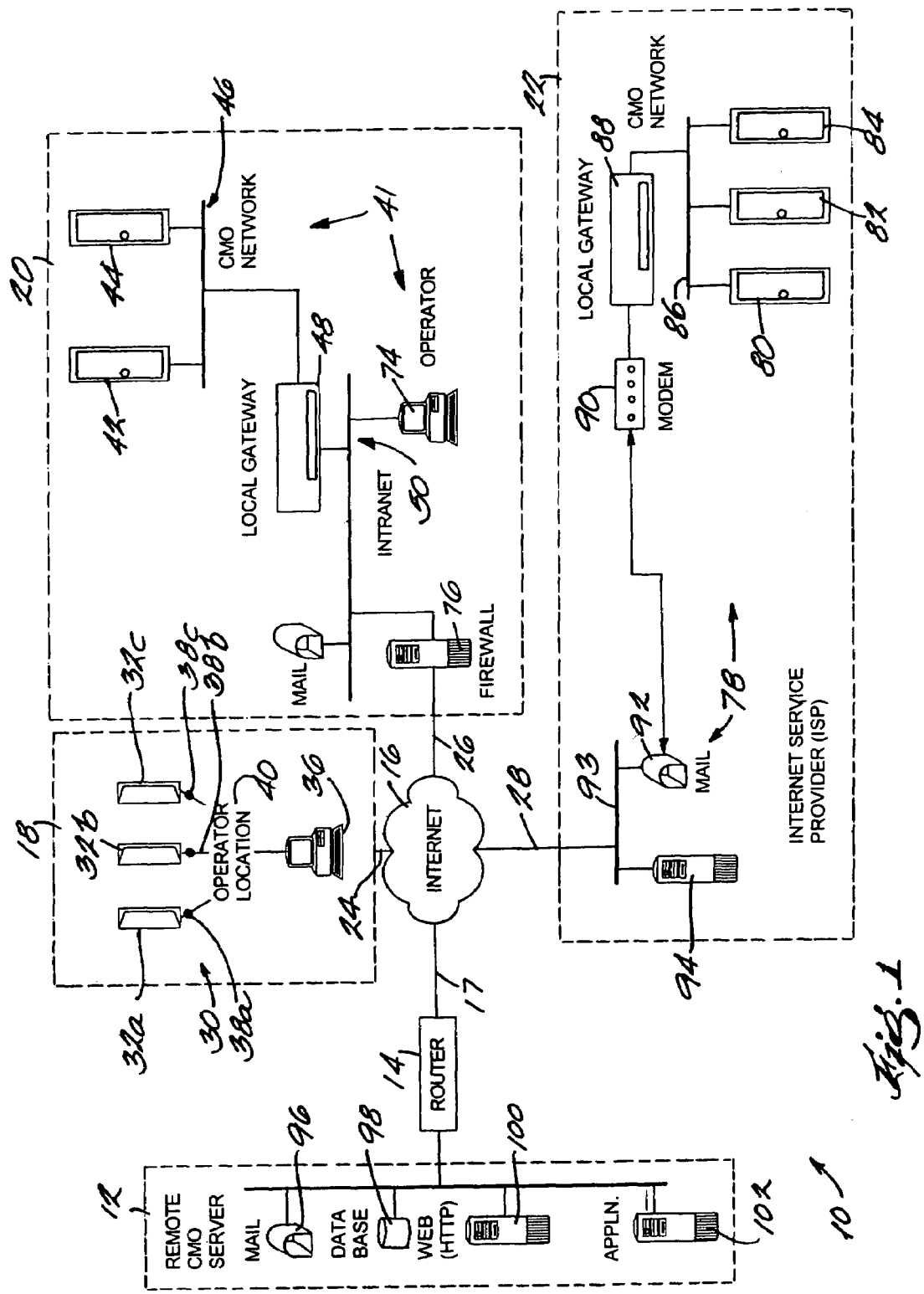
FIG. 1 is a schematic diagram of an internet based access point management system in accordance with one embodiment of the present invention.

An internet based access point management system (APMS) in accordance with an embodiment of the present invention is illustrated generally at 10 in FIG. 1. The internet based APMS 10 comprises a remote computer managed opening (CMO) server 12 that may be connected by a router 14 in a well known manner to the internet 16 via line 17. A first facility 18, second facility 20 and third facility 22 are connected to the internet via lines 24, 26 and 28, although, it will be understood that wireless communication may instead be employed. It will also be understood that while facilities 18, 20 and 22 are illustrated as including different security configurations, e.g. networked versus non networked systems, as discussed in more detail below, one or more facilities having similar security configurations may be employed in accordance with the present invention. Also, while multiple facilities are illustrated, a single facility having one particular security configuration or multiple security configurations may be employed in accordance with this embodiment of the present invention.

As used herein the term access point refers to a location containing a selectively controllable opening such as a gate, door, cabinet, etc.

As used herein the term locking device refers to an electronically controlled device for selectively locking an access point such as, for example, the device described in the previously incorporated U.S. Pat. No. 5,640,863 and U.S. application Ser. No. 09/495,497.

As used herein the term computer managed opening (sometimes herein referred to as a CMO) refers to a computer, e.g. a desk top or lap top, either networked together with, or standing alone from, one or more locking devices each being connected to an access point and, as described in more detail below, any electrical/electronic devices interconnecting the computer with the locking device.

The first facility 18 comprises computer managed openings 30 of the stand alone type each of which comprise an access point 32a, 32b and 32c, computer 36 and a locking device controller 38a, 38b and 38c. The computer 36 is used by an operator, as will be more fully described hereafter, in order to modify operation of the computer managed openings 30. In order to do so, the computer 36 includes a web browser (not shown) for communicating in a known manner over the internet 16 with the remote CMO server 12. The web browser may be any commercially available program such as that sold under the trademark NETSCAPE by the Netscape Communications Corporation of Mountain View, Calif. or the trademark EXPLORER by the Microsoft Corporation of Redmond, Wash. Once the operator has received data from the remote CMO server 12, the operator must download information from the computer 36 to a portable device (not shown) such as a palm top computer. Thereafter, the operator may travel from an operator location 40 to the locking device controllers 38a, 38b and 38c depending upon the particular locking device controller to be updated.

The second facility 20 comprises computer managed openings 41 which are network based and each include an access point 42 and 44, CMO network 46 and a local gateway 48. The local gateway 48 is electrically connected between the CMO network 46 and an intranet 50.

Figure 2:
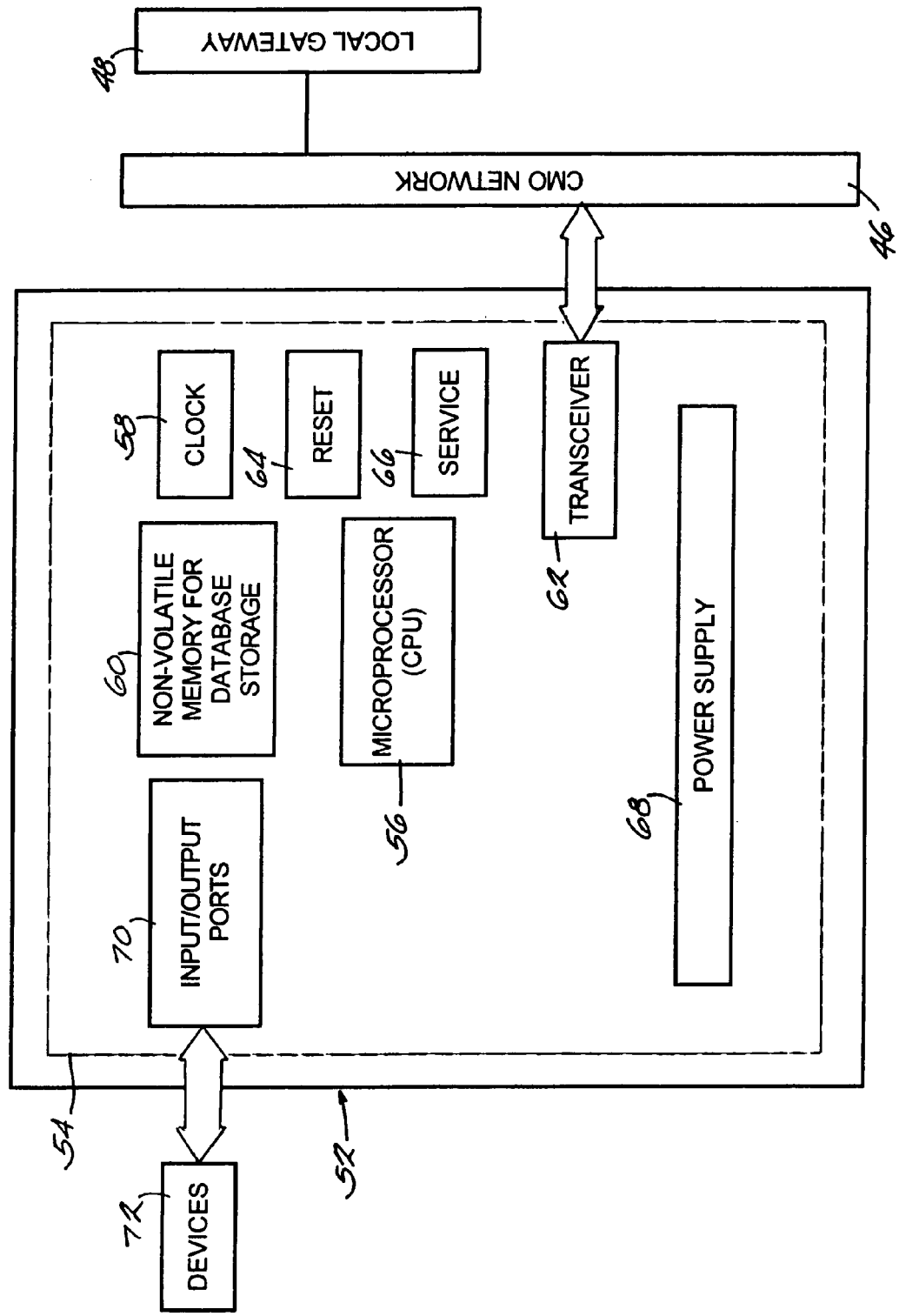
FIG. 2 is a schematic diagram of a controller connected to a local gateway and input/output devices of a computer managed opening in accordance with the embodiment of FIG. 1.

Referring now also to FIG. 2, the local gateway 48 is connected between a controller 52 and the internet 16 and serves as an interface between the controller and the internet, as will be described in more detail hereafter. The controller 52 is, in turn, connected to an access point such as 42, 44 and comprises a printed circuit board 54 having an embedded microprocessor 56, a clock 58, non-volatile memory 60 and a transceiver 62. The embedded microprocessor 56 may be obtained commercially and a suitable microprocessor includes that sold under the name "The Neuron" by the Echelon Corporation of Palo Alto, Calif. and that sold under the name "Nett 5" by Net Silicon of Waltham, Mass. The non-volatile memory 60 may be for example EPROM or EEPROM and contains, e.g., data base information usable for selectively authorizing access through each access point for each individual associated with the facility. The transceiver 62 communicates with the CMO network 46 as is well known. A reset switch 64 and service module connector 66 may also be provided in a known manner. A power supply 68 is provided for energizing the controller 52.

Input/output ports 70 are provided for communicating with devices 72, e.g., a card reader and/or a locking device such as an electromagnetic lock or electric strike which controls opening of, for example, access points 42, 44 which are illustrated as doors. In particular, door locks, cabinet locks or any openings that need a proper credential to verify the privilege of passage "or accessability" may be connected to the controller 52. The microprocessor 56 functions to, among other things, effect locking or releasing of a locking device in response to a users' credential, a prescheduled time, a predefined event or even an emergency situation such as in the event of a fire. An onboard database contained in the nonvolatile memory 60 allows the controller 52 automatically to take such actions. The controller 52 is also able to communicate with the local gateway to extend its functions and update its firmware contained in non-volatile memory 60. Each controller 52 may be identified by a unique logical address in the local CMO network 46.

Referring again only to FIG. 1, an operator computer work station 74 is provided which includes a web browser (not shown) for communicating in a known manner through a fire wall 76 and over the internet 16. The web browser may be any commercially available program such as is discussed above. It will be appreciated that the fire wall 76 may comprise a computer system running a program which prevents passage of undesirable communication between the operator workstation 74 and internet 16. A mail server 78 is connected to the internet 16 and communicates with the local gateway 48 and the computer workstation 74 and the internet 16. Optionally, it will be appreciated that a mail client may be substituted for the mail server 78 where appropriate. The mail server 78 may be disposed on the same computer system as the fire wall 76 and this computer system may also support the intranet 50. Optionally, depending on, e.g., the connection speed supportable by the lines 17 and 26, the mail server 78 may be used to support the firewall 76 and/or intranet 50.

The third facility 22 comprises computer managed openings 78 which are modem based and which include an access point 80, 82, and 84. A CMO network 86 which is connected to a local gateway 88 which communicates with the CMO network and a modem 90. An electronic mail server 92 (or optionally a mail client similar to that discussed above) communicates with the modem 90 (via another modem (not shown)) and internet service provider (ISP) 94. The ISP 94 and mail server 92 may be connected by an intranet 93 and the ISP is in communication with the internet 16 via line 28.

The remote CMO server 12 comprises a mail server 96, a database server 98, a web server 100 and an application server 102. While each of the mail server 96, database server 98, web server 100 and application server 102 are illustrated as being disposed on separate computer processing units. It will be appreciated that all of them may be disposed on one computer processing unit.

The mail server 96 manages incoming and outgoing mail in the respective account directory for each administrator. Outgoing mail is deposited by the application server 102 and is sent to the destination local mail server, e.g., local mail server 78, as soon as it arrives. Incoming mail may be stored in a directory for the application server to pick up. The mail server 96 also serves to formulate and communicate electronic mail to be sent to a particular destination. In particular, a unique e-mail address is assigned to each local mail server 78 and/or local gateway 48 whereby electronic messages may be communicated between the mail server 96, local mail server, local gateway and thereafter to the controller 52.

Figure 3:
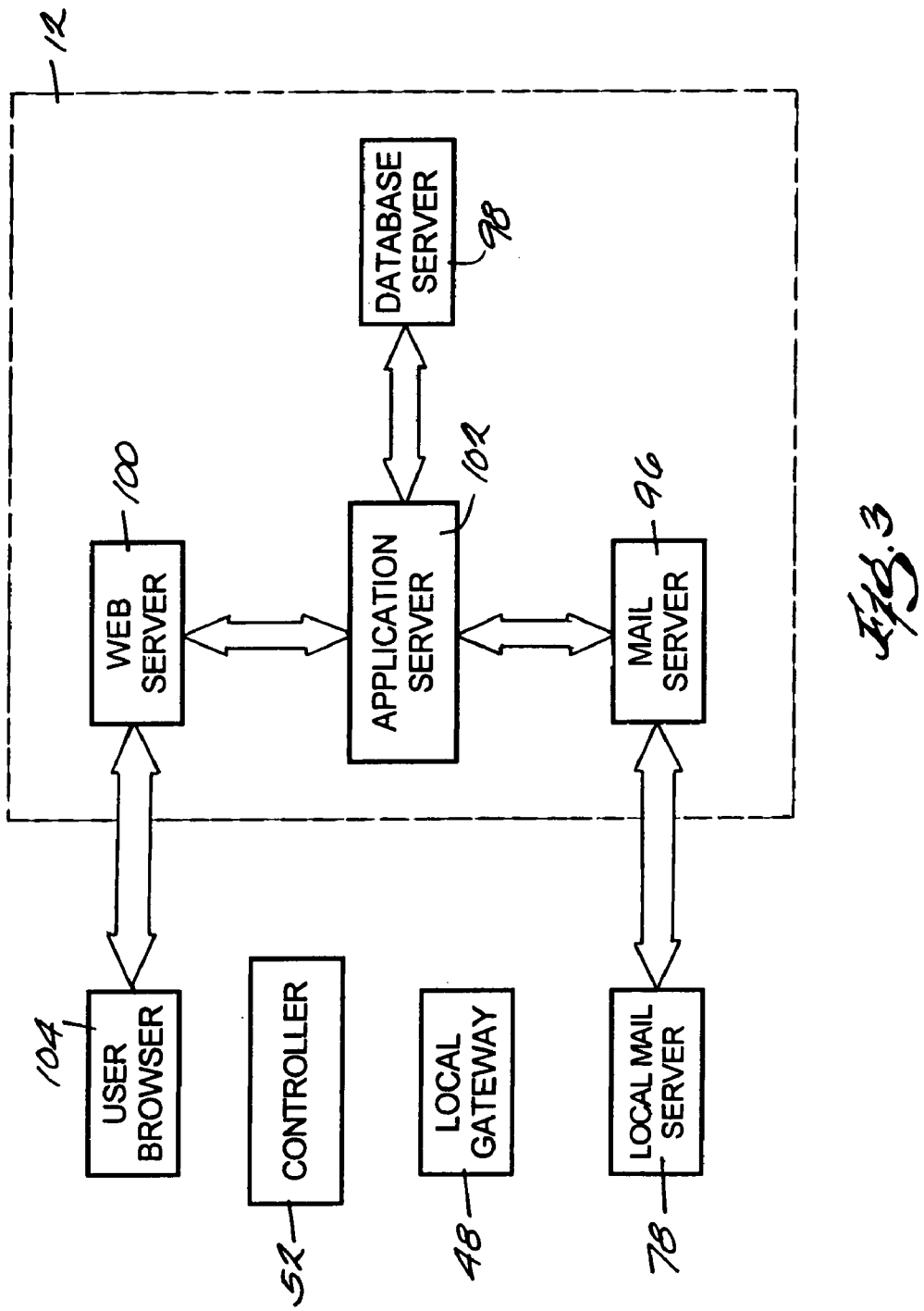
FIG. 3 is a schematic diagram showing the interface between various components of a remote computer managed opening (CMO) server and the interface between the CMO server and user browser and various components of a representative facility in accordance with the embodiment of FIG. 1.

With additional reference to FIG. 3, the web server 100 functions to communicate over the internet with a client browser 104 which may be incorporated, for example, in the work station 74. The web server 100 is commercially available from the Apache Software Foundation of Forest Hill, Md. under the name "Apache Web Server" and handles client requests such as from a client administrator operating a client browser 104. The web server 100 responds to the client browser 104 after communication with the application server 102. In particular, a database server 98 stores various information, described in more detail below, which the application server 102 uses in responding to the web server 100 and formulating system commands for passage to the mail server 96. In this way, the application server 102 communicates with the web server 100 concerning client requests, parses them and then processes the result and/or prepares an acknowledgment for return to the web server 100 which in turn provides this information to the client browser 104. As discussed above, the client browser 104 may be any suitable browser as is well known. In this manner, the client may contact the web server 100 through the client browser 104 in order to perform management functions such as assigning users access credentials which may include preparing an ID card or granting particular access codes.

It will be appreciated that the application server 102 may comprise a software program in a dedicated computer system.

The application server 102 is a coordinator between the service providers and helps the web server 100 to parse and dispatch administrator requests to process and to assemble the response for the web server. The application server 102 decides data flow either to be processed by the data base server 98 or to be returned by the web server 100 through the mail server 96. The application server 102 picks up the incoming mail from the mail server 96 for proper processing. It may authenticate client access if a proxy server is not present. Then application server 102 invokes the database server 98 or other components to process the request and prepare an acknowledgement which is communicated via the web server 100 to the administrator through the web browser 104.

The application server 102 also prepares one or more system commands during processing of the request for modifying the operation of one or more of the computer managed openings. Once the processing of a request has been completed, the application server 102 determines whether the system commands are to be communicated to either the web server 100 or the mail server 96. In the situation where the computer managed opening is of the stand-alone type, such as illustrated in facility 18, the application server 102 may format the system commands in, e.g., file transfer protocol for transfer by the web server 100 to the client browser 104 for downloading by the operator as discussed previously. Otherwise, where the computer managed opening to be modified is network or modem based and includes a local gateway, the application server 102 may, e.g., formulate an electronic mail message based on the system commands to be communicated by the mail server 96 to a local mail server such as local mail server 78. Examples of the format of those messages are discussed in detail hereafter.

Figure 4:
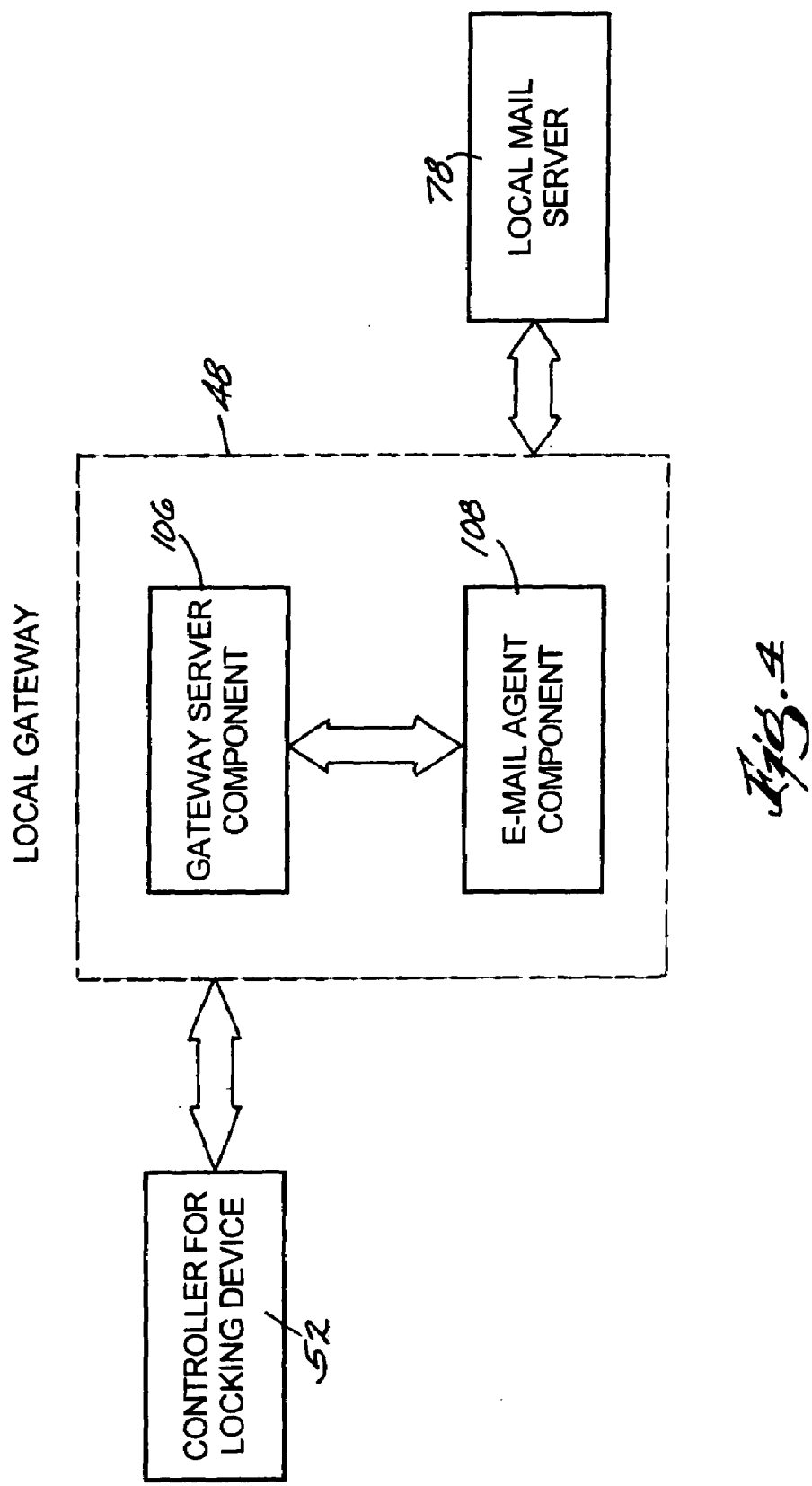
FIG. 4 is a schematic diagram of the communication paths between various elements of a computer managed opening in accordance with the embodiment of FIG. 1.
Figure 5:
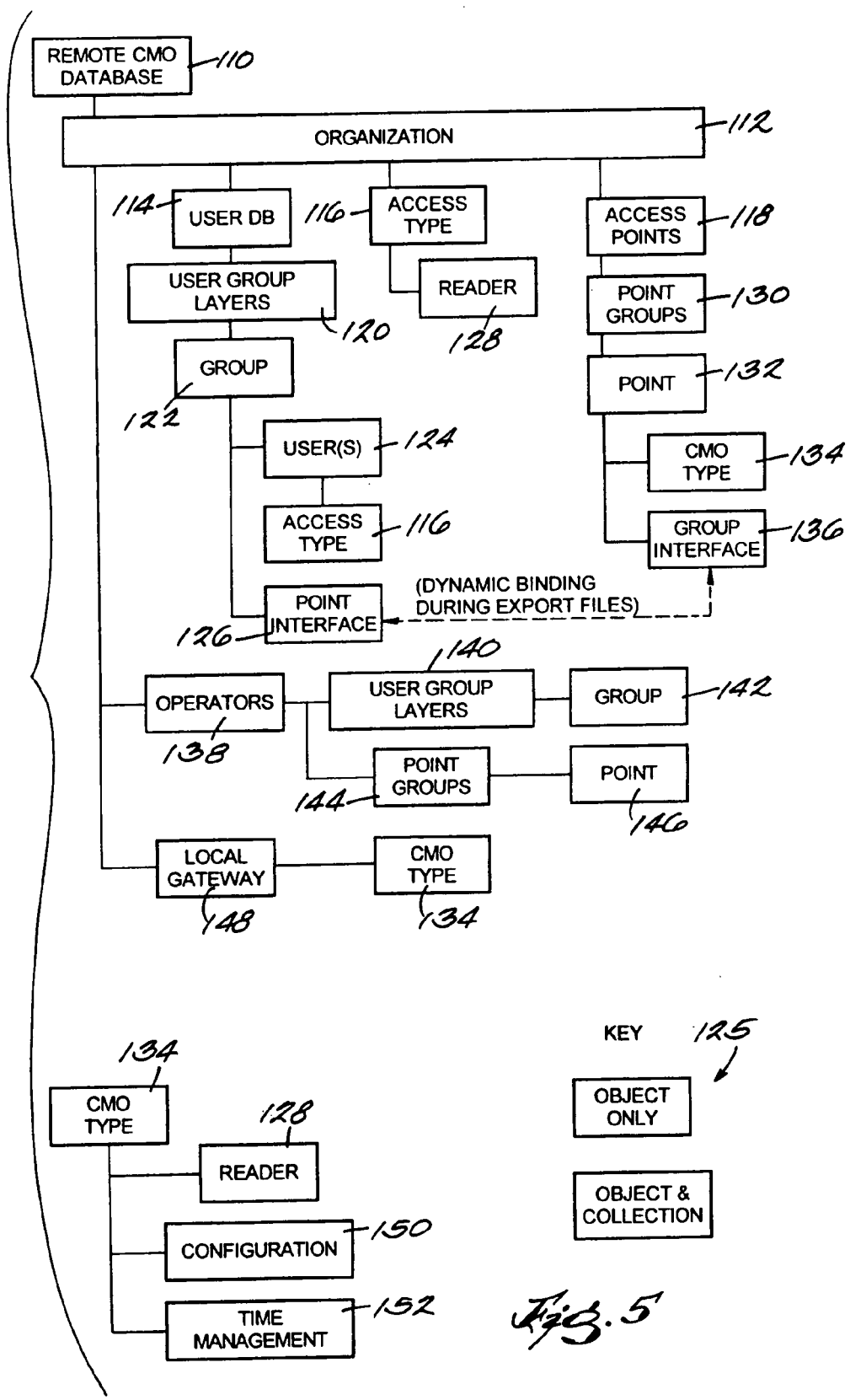
FIG. 5 is a schematic diagram of a relational database employed in accordance with the embodiment of FIG. 1.

Referring now to FIGS. 1 and 4, the local gateway 48 may comprise a gateway server component 106 and an electronic mail agent component 108. The gateway server component 106 communicates with the controller 52 via a communications format such as is illustrated in FIG. 5. In particular, the communications format preferably comprises a byte string from byte 0 to byte 31 where byte 0 is the command identification which may be represented by numerical designation from 0 to 255. The command identification is useful for identifying a particular command such as 03 which may be used to identify a command to update a user's record. An example list of commands represented by numerical designation is as follows.

01 Delete the user database
02 Read on user record
03 Update one use record
04 Verify on user record
05 Update configuration
06 Report configuration
07 Get version
08 Clear network variable
09 Update time
10 Read time
11 Onboard Event History Report
12 Onboard Event History Resume
13 Onboard Event History Clear 14 Request audit trail
15 Search Server database
16 Reserved
17 Signature report
18 Signature reset
19 Release point
20 Door status
21 Number of bytes for onboard database
22 Read next time schedule
23 Read next time zone
24 Report current time schedule
25 Report current time zone
26 Update single time zone
27 Update single time schedule
28 Update single holiday
29 Read I/O buffer
30 Start system status poll
31 Stop system status poll
32 Credential matched
33 Lost credential protection
34 Remote Toggle
35 Packet Acknowledge
36 Update user expiration date
37–255 Reserved for future use Byte 1 provides the length of a command and bytes 2–31 comprise the command. The command may, for example, update the database of the computer managed opening controller 52 to include an additional user and the additional user's access points.

An example of a command string useful in accordance with one embodiment of the present invention is provided in TABLE I which includes the following message in hexadecimal format.

TABLE I

| | |
|---|---|
| Byte 0: | 03 (update user record) |
| Byte 1: | 0A (user record size) |
| Byte 2–3: | 008A (two bytes record number) |
| Byte 4, 5, 6: | 030A08 (three bytes credential number) |
| Byte 7, 8: | 03E1 (two bytes attribute-application specific) |
| Byte 9, 10, 11: | 07EF83 (three bytes expiration date-application specific) |

The electronic mail agent component 108 may comprise either software or firmware and interfaces with the gateway server component for translation of system commands from electronic mail messages into the, for example, LonTalk™ format, as exemplified above. The e-mail agent component 108 also functions to communicate messages in e-mail format with the local mail server 78.

The local CMO gateway 48 comprises two network interface cards NICs (not shown). One of the NICs is connected with the CMO network 46 (FIG. 1) the other of which is connected in circuit with a local area network, i.e., intranet 50. It will be appreciated that the local gateway 88 would not require a second network interface card as it is connected to the modem 90. The local gateway 48 communicates with the remote CMO server 12 via the local mail server 78. The local gateway 48 may optionally also serve as an extended database for each of the controllers 52. In particular, when e.g., a user credential, such as a user ID, is presented at the controller 52 a data base lookup is required to see if the credential is valid. The controller 52 will preferably query its own local database first. If the credential is not found locally, the controller 52 will advantageously request the gateway 48 to query the extended database. The gateway 48 will then respond to the controller 52 based on the results of the query.

The extended data base of the gateway 48 may be configured to maintain a log of transactions by controller 52. When access is granted at the controller 52, a transaction record is passed to the gateway 48. The gateway records the entry in the extended database along with a time and date stamp. This database serves as a log file or audit trail record providing access history. This access history can then be queried to compile access history either by access point or by user. If, for example, the network 46 is not operational, and the controller 52 is unable to communicate with the gateway, the audit trail entry is stored locally in the controller database. The gateway 48 will then collect this information from the controller 52 and append it to the extended database when network 46 operation is restored.

In order to prevent any security breaches in the internet based access point management system 10, the local gateway 48 is programmed to communicate only with the electronic mail server 78 and to achieve this result provides a polling function of the electronic mail server. To further secure the internet based access point management system 10, the electronic mail communicated between mail server 96 and mail servers 78 and 92 may be encrypted with a known encryption method, such as in accordance with the data encryption standard (DES). To achieve this result, the mail servers 78, 92 and 96 may each contain encryption programs.

In the case of facility 22, a modem 90 polls the mail server 92 on a regular basis in order to obtain any e-mail messages. This also reduces any long distance telephone charges.

The format of representative electronic mail messages may be as provided in the following TABLE II.

TABLE II

| E-mail format from remote CMO server to local CMO gateway | |
|---|---|
| Subject: | indicates an internal defined message index identifier (uniquely numbered message) |
| Contents: | empty space |
| Files Attached: | at least one command file and one or more database table files (e.g. a new or revised time zone table). |
| Encryption: | all attached files with predetermined, commercially available methods. |
| Format of the command file sent to local CMO gateway It is a consecutive byte string without delimiter. | |
| Byte 0–1: | random number transaction ID to be used for acknowledgment. |
| Byte 2–3: | number of commands in this byte string. |
| Byte 4–end: | command body. |
| Command body | |
| Byte 0–1: | the length of the command body |
| Byte 2–3: | command ID |
| Byte 4–6: | CMO identification (000–999) |
| Byte 7: | CMO sub ID ('A', 'B', 'C', or 'D'). |
| Byte 8–end: | one or more command parameters. |
| E-Mail format from local CMO gateway to the administrator (or remote servers) | |
| Subject: | transaction ID from the command file if acknowledgment. |
| Contents: | predefined success or failure message. |
| Files attached: | one or more database table files or a single record reporting a transaction if controlled in real time. |
| Encryption: | all attached files. |

It will be understood that while the preferred embodiment provides for the communication between the remote CMO 12 and local gateway 48, 88 via an internet electronic mail format, other formats may be employed as well, such as file transfer protocol (FTP). To achieve this, a file transfer protocol (FTP) server (not shown) may be used in connection with the remote CMO server 12. The FTP server may be used to directly download or upload database information without invoking a mail server. For example, the stand-alone CMO has no gateway to upload onboard database automatically. Therefore, the operator downloads data to the CMO right after the data has been sent to the browser for varying the operation of a CMO. Data can be directly downloaded to a portable device to program the CMO as discussed above. In this situation using an FTP server is more efficient since once the data has been transferred to the web hardware at the web browser, it is in position to be handled by the administrator. A proxy server may also be provided for enhanced security in order to improve the performance by preventing direct access to the data bases. These servers may reside on the same computer running multiple processes or on separate computers and connected in a network fashion.

A security administrator's tool for a given facility is, as discussed above, a standard web browser running on a work station such as work station 74 or any portable computer having internet access. The administrator thus need not perform updates on software or computer components. Instead, the maintenance is handled by off-site centralized highly skilled staff which performs maintenance for numerous other facilities. User training is minimal for the administrator since the standard web browser is the main interface. The administrator may assign dozens or hundreds of users with different access privileges for use with various CMOs.

With reference to FIG. 5, the database server 98 comprises a remote CMO database 110 which may be organized at 112 into three main categories, including a user database 114, an access type database 116 and an access point database 118. The user database 114 encompasses a hierarchy of data and relationships for defining user group layers 120 such as, in a university setting, students, employees and security staff wherein each group layer has a different access requirement, groups 122 such as students and users 124. It will be appreciated that each of the foregoing are related together by object and collection, as noted in the key 125 of FIG. 5. The users 124 are also related by access type 116, for example, card reader or data pad. The group 122 is related to both users 124 and point interface 126. The access type 116 is related to reader 128 which refers to particular card readers, for example. The access points 118 relate to point groups 130 and particular points 132. The point groups, which comprise a collection of access points, may, for example, define various proximal access points or common entranceways for a dormitory. The particular point 132, which may be a room within the dormitory, is related to the CMO type 134 which refers to whether the CMO is a stand-alone, network or modem based. It will be understood that the group interface 136 interacts with the point interface 126 through dynamic binding during the export of files to the particular CMO's.

Operators 138 provide a listing of authorized administrators for each facility, e.g., a particular operator may be a lock and associated equipment installer. Accordingly this operator may have authority to add access points to the system, but no authority to modify user access privileges. Another operator may be a human resource manager who can grant or modify access privileges but can not add or remove access points. Operators 138 are related to user group layers 140 which are related to particular groups 142, and the operators are also related to particular point groups 144 and points 146. The function of the local gateways 148 is to provide a database containing the unique address and data associated with each local gateway as discussed above. The local gateways 148 are also related to particular CMO types 134. CMO types in turn 134 are related to readers 128 particular configurations 150 and time management 152, e.g., for varying the opening and closing times.

With reference to FIGS. 3 and 4, the database server 98 works with the application server 102 to manage the database for various clients through the web server 100, the gateway 88, the mail server 96 and the individual CMO through the gateway.

The data base server 98 preferably manages operations of each individual gateway and CMO and may, for example, store or access the following information. Software components such as for supporting a magnetic stripe card reader (see devices 72 of FIG. 2) or for a component supporting a network protocol. A configuration database having, e.g., the internet protocol address of a particular gateway, a table of devices which are allowed to communicate with a particular gateway, the number and type of CMOs connected to a particular gateway and their addresses, the size of an access history log of a gateway and when it should be purged, etc. Individual CMO identification and firmware such as the latest version of firmware for a CMO or the particular configuration of a CMO, e.g., whether the CMO includes a magnetic stripe reader with an onboard memory for 1000 users, no time zone capability, etc. Gateway and controller onboard databases which may include a transaction log for an access point, the user list for the access point, the time schedule, etc.

While the present invention has been described in connection with what are presently considered to be the most practical and preferred embodiments, it is to be understood that the present invention is not limited to the disclosed embodiments. Rather it is intended to cover all the various modifications and equipment arrangements included within the spirit and scope of the appended claims. For example, the mail components may be implemented with FTP instead of electronic mail format and/or CMO network protocols may be replaced with embedded Transmission Control Protocol/Internet Protocol (TCP/IP) protocols.

What is claimed is:

1. An internet based access point management system accessible by at least one internet web browser configured to communicate one or more requests comprising modifying operation of one or more computer managed openings located at one or more facilities, each facility having at least one access point, an access point referring to a location containing a selectively controllable opening, the internet based access point management system comprising:

at least one computer processor;

a web server operative with the at least one computer processor and being configured to receive and respond to the one or more requests communicated from the at least one web browser;

a database server operative with the at least one computer processor;

an application server operative with the at least one computer processor and being configured to communicate with the web server and the database server for processing the one or more requests, the processing of the one or more requests comprising formulating one or more system commands in response to the one or more requests; and a communication link configured to connect the application server and the one or more computer managed openings for communication therebetween, the communication comprising the one or more system commands which modify operation of the one or more computer managed openings;

wherein at least one of the one or more computer managed openings comprises a computer being selectively interconnected with at least one electronically controlled locking device, and wherein the access point is selectively lockable using at least one of the at least one electronically controlled locking device; wherein each electronically controlled locking device includes a lock and a controller having an associated database memory for storing a credential list for the access point and other data such that the controller automatically effects locking and releasing of the lock upon the presentation of a proper credential regardless of the state of the communication link, and wherein a system command operates to modify the data stored in the controller database memory.

2. The internet based access point management system of claim 1 wherein:

the communication link comprises:

a mail server operative with the at least one computer processor and being configured for communication of electronic messages in electronic mail format over the internet;

a local mail server or mail client operative with another computer processor and being configured to receive the electronic messages in electronic mail format over the internet from the mail server; and a local gateway configured to communicate with the local mail server and the controllers; and the application server is configured to incorporate system commands into electronic messages in electronic mail format and to communicate with the mail server.

3. The internet based access point management system of claim 2 wherein each controller comprises:

a power supply;

a transceiver for communication with the local gateway;

a processor energized by the power supply and connected in circuit with the transceiver;

non-volatile memory connected in circuit with the processor;

a real-time clock connected in circuit with the processor;

an input port for receiving user input; and an output port for connection to the lock, the lock being mechanically connected to the access point.

4. The internet based access point management system of claim 2 wherein the database server stores one or more of the following: individual local gateway electronic mail address, software components, gateway configuration database, individual computer managed opening identification, CMO firmware, CMO configuration and gateway and controller onboard databases.

5. The internet based access point management system of claim 4 wherein the database comprises:

a user database comprising user group layers, user groups related to particular user group layers and users related to particular user groups;

an access type database comprising readers;

an access point database comprising access point groups with particular access points related thereto and to a computer managed opening type;

an operator database comprising operators being related to user group layers and particular user groups, the operators also being related to access point groups and access points;

a local gateway database comprises computer managed opening type; and wherein the users are related to a particular access type and the user groups are related to a particular access point, the computer managed opening type is related to particular readers, configuration database and time management of each access point and/or access point grouping.

6. The internet based access point management system of claim 2 wherein the local gateway comprises a gateway server component and an electronic mail agent component.

7. The internet based access point management system of claim 2 wherein the local gateway converts the electronic messages from the electronic mail format to LonTalk™ protocol.

8. The internet based access point management system of claim 2 wherein the local gateway converts the electronic messages from the electronic mail format to another format comprising a command string comprising a command identification, a length of one or more commands and at least one command.

9. The internet based access point management system of claim 2 wherein the local gateway further comprises an encryption/decryption device for encrypting/decrypting the electronic messages in electronic mail format and further comprising:

an encryption/decryption server operative with the at least one computer processor for encrypting/decrypting the electronic messages in electronic mail format.

10. The internet based access point management system of claim 2 wherein the electronic messages in electronic mail format comprise:

a subject comprising a message index; and attached files comprising at least one command file and at least one database table file.

11. The internet based access point management system of claim 10 wherein the local gateway further comprises an encryption/decryption device for encrypting/decrypting at least one database table file and/or at least one database table file and further comprising:

an encryption/decryption server operative with the at least one computer processor for encrypting/decrypting at least one command file and/or at least one database table file.

12. The internet based access point management system of claim 11 wherein the command file comprises a consecutive byte string absent delimiters.

13. The internet based access point management system of claim 12 wherein the consecutive byte string comprises a transaction identification, a number of commands in the byte string and a command body.

14. The internet based access point management system of claim 13 wherein the command body comprises a length of the command body, a command identification, computer managed opening identification, computer managed opening sub-identification and at least one command parameter.

15. The internet based access point management system of claim 2 wherein the one or more computer managed openings are configured to generate reply messages which are converted into electronic mail format by the local gateway.

16. The internet based access point management system of claim 15 wherein the electronic mail format of the reply messages comprises:
- a subject which comprises at least one of a transaction identification or a message index;
- a contents which comprises a predefined success or failure indication; and
- attached files comprising at least one database table file.

17. The internet based access point management system of claim 16 wherein the local gateway further comprises an encryption/decryption device for encrypting/decrypting at least one database table file and/or at least one database table file and further comprising:
- an encryption/decryption server operative with the at least one computer processor for encrypting/decrypting at least one command file and/or at least one database table file.

18. The internet based access point management system of claim 1 wherein the system commands modify operation of the one or more computer managed openings in order to assign a user's access credentials by grouping a user's access privilege with a respective access point and scheduling time events.

19. The internet based access point management system of claim 1 wherein the processing of the one or more requests by the application server also comprises assembling a response for communication to the web server.

20. The internet based access point management system of claim 1 wherein the at least one computer processor comprises three computer processors and wherein each of the web server, database server and application server each are operative with a separate one of the three computer processors.

21. An internet based access point management system, at least a part of which resides on a computer readable medium and is accessible by at least one internet web browser configured to communicate one or more requests comprising modifying an operation of one or more computer managed openings located at one or more facilities, each facility having at least one access point, an access point referring to a location containing a selectively controllable opening, the internet based access point management system comprising:
- a web server configured to receive and respond to the one or more requests communicated from the at least one web browser;
- a database server;
- an application server configured to communicate with the web server and the database server for processing the one or more requests, the processing of the one or more requests comprising formulating one or more system commands in response to the one or more requests; and
- a communication link configured to connect the application server and the one or more computer managed openings for communication therebetween, the communication comprising the one or more system commands which modify operation of the one or more computer managed openings;
- wherein at least one of the one or more computer managed openings comprises a computer being selectively interconnected with at least one electronically controlled locking device, and wherein the selectively controllable opening is selectively lockable using at least one of the at least one electronically controlled locking device; wherein each electronically controlled locking device includes a lock and a controller having an associated database memory for storing a credential list for the access point and other data such that the controller automatically effects locking and releasing of the lock upon the presentation of a proper credential regardless of the state of the communication link, and wherein a system command operates to modify the data stored in the controller database memory.

22. The internet based access point management system of claim 21 wherein:
the communication link comprises:
- a mail server operative with at least one computer processor and configured for communication of electronic messages in electronic mail format over the internet;
- a local mail server or mail client operative with at least one computer processor and configured to receive the electronic messages in electronic mail format over the internet from the mail server; and
- a local gateway configured to communicate with the local mail server and the controllers; and the application server is configured to incorporate system commands into electronic messages in electronic mail format and to communicate with the mail server.

23. The internet based access point management system of claim 22 wherein each controller comprises:
- a power supply;
- a transceiver for communication with the local gateway;
- a processor energized by the power supply and connected in circuit with the transceiver;
- non-volatile memory connected in circuit with the processor;
- a real-time clock connected in circuit with the processor;
- an input port for receiving user input; and
- an output port for connection to the lock, the lock being mechanically connected to the access point.

24. The internet based access point management system of claim 22 wherein the local gateway comprises a gateway server component and an electronic mail agent component.

25. The internet based access point management system of claim 24 wherein the local gateway converts the electronic messages from the electronic mail format to another format comprising a command string comprising a command identification, a length of one or more commands and at least one command.

26. The internet based access point management system of claim 22 wherein the electronic messages in electronic mail format comprise:
- a subject comprising a message index; and
- attached files comprising at least one command file and at least one database table file.

27. The internet based access point management system of claim 26 wherein the local gateway further comprises an encryption/decryption device for encrypting/decrypting at least one command file and/or at least one database table file and further comprising:
- an encryption/decryption server for encrypting/decrypting at least one command file and/or at least one database table file.

28. The internet based access point management system of claim 27 wherein the command file comprises a consecutive byte string absent delimiters.

29. The internet based access point management system of claim 28 wherein the consecutive byte string comprises a transaction identification, a number of commands in the consecutive byte string and a command body.

30. The internet based access point management system of claim 29 wherein the command body comprises a length of the command body, a command identification, computer managed opening identification, computer managed opening sub-identification and at least one command parameter.

31. The internet based access point management system of claim 22 wherein the one or more computer managed openings are configured to generate reply messages which are converted into electronic mail format by the local gateway.

32. The internet based access point management system of claim 31 wherein the electronic mail format of the reply messages comprises:
   a subject which comprises at least one of a transaction identification or a message index;
   a contents which comprises a predefined success or failure indication; and
   attached files comprising at least one database table file.

33. The internet based access point management system of claim 32 wherein the local gateway further comprises an encryption/decryption device for encrypting/decrypting at least one database table file and/or at least one database table file and further comprising:
   an encryption/decryption server operative with the at least one computer processor for encrypting/decrypting at least one command file and/or at least one database table file.

34. The internet based access point management system of claim 33 further comprising:
   a file transfer protocol server operative with a computer processor and configured to communicate with the web browser for converting the system commands into a format compatible with that used by access points and for downloading the system commands to a portable device for transfer to a particular controller.

35. An internet based access point management system accessible by at least one internet web browser communicating one or more requests for modifying operation of one or more computer managed openings located at one or more facilities, each facility having at least one access point, an access point referring to a location containing a selectively controllable opening, the internet based access point management system comprising:
   at least one computer processor;
   a web server operative with the at least one computer processor and configured to receive and respond to the one or more requests from the at least one web browser;
   a database server operative with the at least one computer processor; and
   an application server operative with the at least one computer processor and configured to communicate with the web server and the database server for receiving and processing commands, the processing of commands comprising formulating one or more system commands for communication to the web browser by the web server;
   wherein at least one of the one or more computer managed openings comprises a computer being selectively interconnected with at least one electronically controlled locking device, and wherein the selectively controllable opening is selectively lockable using at least one of the at least one electronically controlled locking device;
   wherein each electronically controlled locking device includes a lock and a controller having an associated database memory for storing a credential list for the access point and other data such that the controller automatically effects locking and releasing of the lock upon the presentation of a proper credential regardless of the state of the communication link, and wherein a system command operates to modify the data stored in the controller database memory, and wherein the system commands modify operation of the one or more computer managed openings in order to assign a user's credentials by grouping a user's access privilege with a respective access point and scheduling time events.

36. An internet based access point management system at least partially residing on a computer readable medium and being accessible by at least one internet web browser communicating one or more requests for modifying operation of one or more computer managed openings located at one or more facilities, each facility having at least one access point, an access point referring to a location containing a selectively controllable opening, the internet based access point management system comprising:
   a web server configured to receive and respond to the one or more requests from the at least one web browser;
   a database server; and
   an application server being configured to communicate with the web server and the database server for receiving and processing commands, the processing of commands comprising formulating system commands for communication to the web browser by the web server;
   wherein at least one of the one or more computer managed openings comprises a computer being selectively interconnected with at least one electronically controlled locking device, and wherein the selectively controllable opening is selectively lockable using at least one of the at least one electronically controlled locking device;
   wherein each electronically controlled locking device includes a lock and a controller having an associated database memory for storing a credential list for the access point and other data such that the controller automatically effects locking and releasing of the lock upon the presentation of a proper credential regardless of the state of the communication link, and wherein a system command operates to modify the data stored in the controller database memory, and wherein the system commands modify operation of the one or more computer managed openings in order to assign a user's credentials by grouping a user's access privilege with a respective access point and scheduling time events.

37. The internet based access point management system of claim 36 wherein the one or more computer managed openings each comprise at least one access point and further comprising:
   a file transfer protocol server operative with a computer processor and configured to communicate with the web browser for converting the system commands into a format compatible with that used by the access points and for downloading the system commands to a portable device for transfer to a particular controller.

38. A method of managing an access control system for a facility, the facility employing at least one computer managed opening and having at least one access point, an access point referring to a location containing a selectively controllable opening, said method comprising the steps of:
   generating a request to modify operation of one or more computer managed openings which are stand-alone, network or modem based;
   communicating the request to a remote computer managed opening server;
   processing the request at the remote computer managed opening server in order to generate an acknowledgement of the request and to generate one or more system commands;
   selecting the appropriate electronic format for the one or more system commands depending upon whether the one or more computer managed openings are stand-alone, network or modem based, wherein the step of selecting the appropriate electronic format is also performed by the application server and comprises selecting file transfer protocol for the system commands where the computer managed opening is stand-alone based and selecting electronic mail message format for the system commands where the computer managed opening is network or modem based; and communicating the one or more system commands to the appropriate computer managed opening for modifying operation thereof;

wherein at least one of the one or more computer managed openings comprises a computer being selectively interconnected with at least one electronically controlled locking device, and wherein the selectively controllable opening is selectively lockable using at least one of the at least one electronically controlled locking device.

39. The method of claim 38, wherein:

the step of generating a request comprises inputting data to a web browser;

the step of communicating the request comprises passing the request from the web browser to a web server over the internet; and the step of processing is performed by an application server and comprises retrieving data concerning one or more computer managed openings from a data base.

40. The method of claim 39, wherein:

the step of communicating the one or more system commands comprises:

communicating the system commands in file transfer protocol to the web server for communication to the web browser where the computer managed opening is stand-alone, whereupon an administrator may download and transfer the system commands to a controller; and communicating the system commands to a mail server in electronic mail message format for communication thereof to a local mail server, the local mail server communicating the system commands to a local gateway which translates the system commands into another format for communication to one or more controllers.

41. The method of claim 40 wherein the local gateway translates electronic mail message format into a command string comprising a command identification, a length of one or more commands and at least one command.

42. The method of claim 40 wherein the electronic messages in electronic format comprises:

a subject comprising a message index; and attached files comprising at least one command file and at least one database table file.

43. The method of claim 42 further comprises the steps of encrypting and decrypting the command file and/or the data base table file.

44. The method of claim 43 wherein the command file comprises a consecutive byte string absent delimiters.

45. The method of claim 44 wherein the consecutive byte string comprises a transaction identification, a number of commands in the consecutive byte string and a command body.

46. The method of claim 45 wherein the command body comprises a length of the command body, a command identification, computer managed opening identification, computer managed opening sub-identification and at least one command parameter.

47. The method of claim 40 further comprising the step of generating reply messages by the computer managed opening and the reply messages being in electronic mail format.

48. The method of claim 47 wherein the electronic mail format of the reply messages comprises:

a subject which comprises at least one of a transaction identification or a message index;

a contents which comprises a predefined success or failure indication; and attached files comprising at least one database table file.

49. The method of claim 48 further comprising the steps of encrypting and decrypting the reply messages.

* * * * *

UNITED STATES PATENT AND TRADEMARK OFFICE
CERTIFICATE OF CORRECTION

| | |
|---|---|
| PATENT NO. | : 7,181,507 B1 |
| APPLICATION NO. | : 09/618516 |
| DATED | : February 20, 2007 |
| INVENTOR(S) | : Gary E. Lavelle et al. |

It is certified that error appears in the above-identified patent and that said Letters Patent is hereby corrected as shown below:

Item [56] OTHER PUBLICATIONS on page 2, last reference, replace "Sather-13" with "Sather-"

Claim 37, line 43-44, delete "wherein the one or more computer managed openings each comprise at least one access point and"

Signed and Sealed this

Seventh Day of August, 2007

JON W. DUDAS
*Director of the United States Patent and Trademark Office*